United States Patent
Pettersen (10) Patent No.: US 8,924,247 B2
(45) Date of Patent: Dec. 30, 2014

(54) RANKING SYSTEM USING INSTANT POST-TRANSACTION SURVEYING OF TRANSACTION JUDGES

(75) Inventor: Per Pettersen, Los Angeles, CA (US)

(73) Assignee: LoadPoint, Inc, Santa Monica, CA (US)

(*) Notice: Subject to any disclaimer, the term of this patent is extended or adjusted under 35 U.S.C. 154(b) by 1228 days.

(21) Appl. No.: 11/373,633

(22) Filed: Mar. 9, 2006

(65) Prior Publication Data

US 2006/0155642 A1 Jul. 13, 2006

Related U.S. Application Data

(63) Continuation-in-part of application No. 11/207,571, filed on Aug. 19, 2005, now Pat. No. 7,970,690.

(60) Provisional application No. 60/603,442, filed on Aug. 19, 2004, provisional application No. 60/610,470, filed on Sep. 15, 2004, provisional application No. 60/637,231, filed on Dec. 18, 2004, provisional application No. 60/674,868, filed on Apr. 25, 2005.

(51) Int. Cl.
*G06Q 30/00* (2012.01)
*G06Q 10/00* (2012.01)

(52) U.S. Cl.
USPC ............ 705/14.16; 705/7.35; 705/26.62

(58) Field of Classification Search
USPC ............ 705/10, 7.11–7.42, 14.16, 26.62
See application file for complete search history.

(56) References Cited

U.S. PATENT DOCUMENTS

| | | | |
|---|---|---|---|
| 4,757,267 A | 7/1988 | Riskin | |
| 4,774,664 A | 9/1988 | Campbell et al. | |
| 4,992,940 A | 2/1991 | Dworkin | |
| 5,218,539 A | 6/1993 | Elphick et al. | |
| 5,231,571 A | 7/1993 | D'Agostino | |
| 5,239,462 A | 8/1993 | Jones et al. | |
| 5,283,731 A | 2/1994 | Lalonde et al. | |
| 5,592,375 A | 1/1997 | Salmon et al. | |
| 5,611,052 A | 3/1997 | Dykstra et al. | |
| 5,664,115 A | 9/1997 | Fraser | |

(Continued)

FOREIGN PATENT DOCUMENTS

EP 0 840 244 A1 5/1998

OTHER PUBLICATIONS

International Search Report, PCT/US07/05795, mailing date Aug. 25, 2008.

(Continued)

*Primary Examiner* — Sujay Koneru
(74) *Attorney, Agent, or Firm* — Haynes and Boone, LLP (57) ABSTRACT

After a telecommunications interaction apparently concludes between first and second parties to the interaction, an automated means for detecting the termination of the interaction jumps in and presents at least one of the parties with an opportunity to participate in a survey (an instant survey) relating to the just-terminated interaction. In one embodiment, the interaction is between a prospective consumer and a lead buyer (or an agent of the buyer) and the instant survey queries the buyer or agent regarding immediate impressions of the quality of the purchased lead that brought the prospective consumer and the lead buyer (or agent) into contact with one another. In one embodiment, results of instant surveys feed into a ranking system that ranks the quality of leads provided through a specific sponsor and remuneration to the sponsor is automatically adjusted according to instant survey results collected for that sponsor.

8 Claims, 2 Drawing Sheets

(56) References Cited

U.S. PATENT DOCUMENTS

| | | |
|---|---|---|
| 5,671,279 A | 9/1997 | Elgamal |
| 5,699,527 A | 12/1997 | Davidson |
| 5,710,887 A | 1/1998 | Chelliah et al. |
| 5,758,328 A | 5/1998 | Giovannoli |
| 5,774,882 A | 6/1998 | Keen et al. |
| 5,774,883 A | 6/1998 | Andersen et al. |
| 5,794,207 A | 8/1998 | Walker et al. |
| 5,794,219 A | 8/1998 | Brown |
| 5,797,133 A | 8/1998 | Jones et al. |
| 5,842,178 A | 11/1998 | Giovannoli |
| 5,862,223 A * | 1/1999 | Walker et al. ............... 705/50 |
| 5,870,721 A | 2/1999 | Norris |
| 5,875,437 A | 2/1999 | Atkins |
| 5,878,403 A | 3/1999 | DeFrancesco et al. |
| 5,913,202 A | 6/1999 | Motoyama |
| 5,937,391 A | 8/1999 | Ikeda et al. |
| 5,940,807 A | 8/1999 | Purcell |
| 5,940,811 A | 8/1999 | Norris |
| 5,940,812 A | 8/1999 | Tengel et al. |
| 5,946,665 A | 8/1999 | Suzuki et al. |
| 5,966,699 A | 10/1999 | Zandi |
| 5,966,700 A | 10/1999 | Gould et al. |
| 5,970,472 A | 10/1999 | Allsop et al. |
| 5,974,119 A | 10/1999 | Utsumi |
| 5,974,406 A | 10/1999 | Bisdikian et al. |
| 5,987,434 A | 11/1999 | Libman |
| 5,987,440 A | 11/1999 | O'Neil et al. |
| 5,987,500 A | 11/1999 | Arunachalam |
| 5,995,947 A | 11/1999 | Fraser et al. |
| 6,014,645 A | 1/2000 | Cunningham |
| 6,041,308 A | 3/2000 | Walker et al. |
| 6,058,379 A | 5/2000 | Odom et al. |
| 6,067,525 A | 5/2000 | Johnson et al. |
| 6,073,129 A | 6/2000 | Levine et al. |
| 6,076,072 A | 6/2000 | Libman |
| 6,085,169 A | 7/2000 | Walker et al. |
| 6,088,686 A | 7/2000 | Walker et al. |
| 6,105,007 A | 8/2000 | Norris |
| 6,108,639 A | 8/2000 | Walker et al. |
| 6,112,190 A | 8/2000 | Fletcher et al. |
| 6,134,534 A | 10/2000 | Walker et al. |
| 6,202,054 B1 | 3/2001 | Lawlor et al. |
| 6,226,623 B1 | 5/2001 | Schein et al. |
| 6,236,972 B1 | 5/2001 | Shkedy |
| 6,236,977 B1 | 5/2001 | Verba et al. |
| 6,243,691 B1 | 6/2001 | Fisher et al. |
| 6,260,024 B1 | 7/2001 | Shkedy |
| 6,282,517 B1 | 8/2001 | Wolfe et al. |
| 6,289,319 B1 | 9/2001 | Lockwood |
| 6,311,178 B1 | 10/2001 | Bi et al. |
| 6,332,129 B1 | 12/2001 | Walker et al. |
| 6,337,904 B1 * | 1/2002 | Gisby ............... 379/210.01 |
| 6,341,270 B1 | 1/2002 | Esposito et al. |
| 6,356,878 B1 | 3/2002 | Walker et al. |
| 6,385,594 B1 | 5/2002 | Lebda et al. |
| 6,397,197 B1 * | 5/2002 | Gindlesperger ............ 705/37 |
| 6,513,013 B1 * | 1/2003 | Stephanou ............... 705/9 |
| 6,546,374 B1 | 4/2003 | Esposito et al. |
| 6,587,838 B1 | 7/2003 | Esposito et al. |
| 6,603,487 B1 | 8/2003 | Bennett et al. |
| 6,611,816 B2 | 8/2003 | Lebda et al. |
| 6,636,590 B1 * | 10/2003 | Jacob et al. ............ 379/114.05 |
| 6,669,832 B1 | 12/2003 | Saito et al. |
| 6,684,189 B1 | 1/2004 | Ryan et al. |
| 6,704,403 B2 * | 3/2004 | Lurie et al. ............ 379/114.1 |
| 6,868,389 B1 | 3/2005 | Wilkins et al. |
| 7,010,508 B1 | 3/2006 | Lockwood |
| 7,023,979 B1 | 4/2006 | Wu et al. |
| 7,035,699 B1 * | 4/2006 | Anderson et al. ............ 700/90 |
| 7,047,206 B1 * | 5/2006 | Schultze ............... 705/10 |
| 7,068,643 B1 | 6/2006 | Hammond |
| 7,133,835 B1 | 11/2006 | Fusz et al. |
| 7,139,732 B1 * | 11/2006 | Desenberg ............... 705/37 |
| 7,181,427 B1 | 2/2007 | DeFrancesco et al. |
| 7,216,102 B2 | 5/2007 | Nabe |
| 7,246,077 B1 * | 7/2007 | Pych ............... 705/7.31 |
| 7,272,579 B1 * | 9/2007 | Canali et al. ............ 705/37 |
| 7,310,617 B1 | 12/2007 | Cunningham |
| 7,340,411 B2 * | 3/2008 | Cook ............... 705/10 |
| 7,386,508 B1 | 6/2008 | Walker et al. |
| 2001/0049648 A1 | 12/2001 | Naylor |
| 2002/0010608 A1 * | 1/2002 | Faber et al. ............ 705/8 |
| 2003/0154120 A1 | 8/2003 | Freishtat et al. |
| 2003/0225682 A1 | 12/2003 | Montemer |
| 2004/0093275 A1 * | 5/2004 | Snelson et al. ............ 705/26 |
| 2004/0230438 A1 * | 11/2004 | Pasquale et al. ............ 705/1 |
| 2005/0125334 A1 * | 6/2005 | Masella et al. ............ 705/38 |
| 2005/0144052 A1 * | 6/2005 | Harding et al. ............ 705/7 |
| 2005/0147228 A1 * | 7/2005 | Perrella et al. ............ 379/265.06 |
| 2005/0149397 A1 * | 7/2005 | Morgenstern et al. ............ 705/14 |
| 2005/0149432 A1 * | 7/2005 | Galey ............... 705/38 |
| 2005/0234798 A1 * | 10/2005 | Du Preez et al. ............ 705/37 |
| 2005/0273423 A1 * | 12/2005 | Kiai et al. ............ 705/38 |
| 2006/0026089 A1 * | 2/2006 | Replanski et al. ............ 705/37 |

OTHER PUBLICATIONS

Written Opinion of the International Searching Authority, PCT/US07/05795.

Walker, Larry, "Adapting to a Consumer-Driven Marketplace", pp. 34-37, Housing Finance International.

Cocheo, Steve, "Automated underwriting: Tower of techno-Babel?", Sep. 1995, pp. 68, 72, 74, 104, First of a Series—Mortgage Lending, ABA Banking Journal.

"Chase Manhattan Mortgage Corporation Teams With Intuit as a Charter Lender for QuickenMortgage", Oct. 14, 1997, 1 page, Mountain View, California.

Trademark Search of Creditsource USA mark.

"Intuit Launches QuickenMortgage on the Internet", Nov. 4, 1997, 2 pages, Mountain View, California.

"Intuit's QuickenMortgage 2.0 Offers Online Applications & Five New Lenders", Mar. 11, 1998, 2 pages, Mountain View, California.

Cohen, Jackie, "To Mall or Not to Mall", May 1, 1998, 7 pages, vol. 11, No. 5, Bank Technology News.

Lending Tree, LLC history, pp. 293-296, vol. 93, International Directory of Company Histories.

Leong, S.K., et al., "An Internet application for on-line banking", Jul. 18, 1997, pp. 1534-1540, Computer Communications 20.

Guttentag, Jack, et al., "Point-of-Sale Mortgage Technology", pp. 3-12, Housing Finance International.

"QuickenMortgage, One of the Most Popular Mortgage Web Sites, Celebrates One Year Anniversary", Nov. 5, 1998, 2 pages, Mountain View, California.

Megboluge, Isaac F., "Residential Real Estate in the Age of Information Technology", Dec. 1997, pp. 1-6, Housing Finance International.

Cocheo, Steve, "Scoring gains ground while the Web waits", Jan. 1997, p. 52, vol. 89, No. 1.

Malone, Thomas, W., "What is Coordination Theory", Feb. 19, 1988, pp. 1-29, Massachusetts Institute of Technology, Cambridge, Massachusetts.

"The Mortgage Loan Page-tm, Free Mortgage Broker Search Engine", 2 pages, May 8, 1996, Comcity—News & Press Release, Fremont, California.

Williamson, A.G., "Refining a neural network credit application vetting system with a genetic algorithm", 1995, pp. 261-277, vol. 18, Journal of Microcomputer Applications, United Kingdom.

Morgan-Baldwin, Amelia A., et al., "Strategy and Impacts of Expert Systems for Bank Lending", 1996, pp. 455-461, vol. 11, No. 4, Expert Systems With Applications.

"Auto-By-Tel: The Premiere Auto Buying Service on the Internet", Feb. 5, 1998, 1 page, http://replay.waybackmachine.org/19980205084049/http://autobytel.com/about/index.cfm?id=abt.

WayBackMachine internet page regarding Mortgages, Apr. 24, 1998, 1 page, http://replay.waybackmachine.org/19980425195033/http://loanpage.com/.

InsWeb, "A Better Way to Handle Your Insurance Needs", Apr. 11, 192011, 1 page, http://replay.waybackmachine.org/19980213062755/http://www1.insweb.com/.

(56) References Cited

OTHER PUBLICATIONS

LoanWeb.com information page, Apr. 25, 1998, 1 page, http://replay.waybackmachine.org/19980425195926/http://loanweb.com/.
WayBackMachine internet page regarding GetSmart, Feb. 13, 1998, 1 page, http://replay.waybackmachine.org/19980213053619/http://www1.getsmart.com/.
E-Loan internet page, 1997, 1 page, Palo Alto, California, http://replay.waybackmachine.org/19980127150039/http://eloan.com/.
4freequotes.com's National Insurance Directory homepage, Apr. 22, 1998, 1 page, http://replay.waybackmachine.org/19980422084203/http://www.4freequotes.com/.
WayBackMachine directory page, May 22, 1998, 1 page, http://replay.waybackmachine.org/19980522084055/http://credit.com/.
WayBackMachine directory page, Dec. 12, 1998, 1 page, http://replay.waybackmachine.org/19981206025209/http://www.theloanpage.com/.
WayBackMachine loanlocator.com page, Apr. 2005, 2 pages, http://replay.waybackmachine.org/19981212032218/http://www.rates.com/.
WayBackMachine—The Golden Credit Union homepage, Jun. 4, 1997, page 1, http://replay.waybackmachine.org/19970604123321/http://www.golden1.com/.
WayBackMachine—Insuremarket, Your Online Insurance Resource, Jan. 15, 1998, 2 pages, http://replay.waybackmachine.org/19980115063409/http://www.insuremarket.com/.
WayBackMachine Mortgage homepage, Jan. 17, 1999, 1 page, http://replay.waybackmachine.org/19990117025241/http://www.chase.com:8009/noframes/mortgage-homepage.html.
WayBackMachine, "The key to smarter, easier borrowing", Jun. 29, 1997, 2 pages, http://replay.waybackmachine.org/19970629193656/http://www.citibank.com/us/borrowandloans/.
CMSI Products homepage, May 18, 1998, 2 pages, http://replay.waybackmachine.org/19980518225413/http://www.cmsinc.com/product.htm.
WayBackMachine, "Online Resources & Communications Corporation", Feb. 1997, 1 page, http://replay.waybackmachine.org/19980422144823/http://orcc.com/.
Free New Tools Designed to Help Carpoint-Affiliated Dealers Respond as Quickly as Possible to Customer Inquiries, Oct. 20, 1998, Microsoft.com, 1 page, Redmond, Washington.
Microsoft Licenses DealerPoint Technology to Help Honda and Acura Dealers Manage Internet Sales, Sep. 20, 1999, Microsoft.com, 1 page, San Francisco, California.
Auto-By-Tel advertisement, 1996, 3 Pages, Auto-By-Tel Corporation, Irvine, California.
A Better Way to Handle Your Insurance Needs advertisement, Feb. 20, 2008, 1 page.
AutoWeb Interactive advertisement.
1997 BMW 3 Series M3 Price Quote, 1997 Ford Ranger SuperCab XLT 4x4 125WB Price Quote, CarPoint, 1997 Honda Accord Price Quote, 3 pages.
1997 Ford Ranger SuperCab XLT 4x4 125WB Price Quote.
"AutoWeb Interactive wins the PC Magazine Top 100 Web Sites award for the Second time!", 1 page, Apr. 18, 1997.
Press Releases, InsWeb Announces Inclusion in Microsoft Money 99 Financial Suite, Aug. 10, 1998, 1 page, San Mateo, California.
Press Releases, 1 Million Consumers Use InsWeb in First Half of 199, Aug. 5, 1998, 1 page, San Mateo, California.
Press Releases, Infoseek Launches Auto Insurance Center Powered by InsWeb, Sep. 15, 1998, 1 page, San Mateo, California.
Press Releases, InsWeb PR articles.
Steffen, Don, "Probable Tax Changes", Jun. 27, 1997, Weekly Update Tax News and Analysis, San Francisco, California.
WayBackMachine article, http://www.insweb.com, 1 page.
Kane, Margaret, "Microsoft auto software hits exit ramp", CNET News.com, Jan. 22, 2003, 1 page.
Microsoft Delarpoint.Net Announces First International Deployment of Its Lead Management System to Ford Dealers Across United Kingdom, Dec. 11, 2001, 1 page, Redmond, Washington.
Microsoft Licenses DealerPoint Technology to Help Honda and Acura Dealers Manage Internet Leads, Sep. 20, 1999, 1 page, San Francisco, California.
Cox, Beth, Microsoft Sells Off Dealerpoint, Real IT News, Jan. 22, 2003, 1 page.
Auto Channel list, 1 page.
Markoff, John, "A Web-Researched Ford in Microsoft's Future", The New York Times, Sep. 21, 1999, 1 page.
Bobulsky, Steve, "We Connect North American Automobile Dealers and Related Businesses to The Internet and The World Wide Web,", Webwise, www.webwheels.com, 1 page.
LendingTree, "Apply in Minutes, Know Within Hours.", 1999, www.lendingtree.com, 2 pages.
Paul, Lauren Gibbons, et al., "10 who dared to be different", PC Week, v14, n1, Jan. 6, 1997, p. 21(4).
"Retail Technology", Automative News, Jan. 12, 1998, 1 page.
Jiang, et al., "A Concept-Based Approach to Retrieval from an Electronic Industrial Directory", International Journal of Electronic Commerce, Fall 1996, vol. 1, No. 1, pp. 51-72.
Doorenbos, et al., "A Scalable Comparison-Shopping Agent for the World-Wide Web", Department of Computer Science and Engineering, University of Washington, 1997, 1 page.
Wildemuth, Scott, "A simple case of supply and demand", Datamation, v43, n11, p. 99(3), Nov. 1997, 1 page.
McClanahan, Robert H., "A System to Distribute Real-Time Operational Data Utilizing Existing Public Communications Infrastructure", Technical Information Systems, p. C6-1.
Andreasen, Louis, et al., "ADSI: The dawn of a new age of interactive services", Ottawa: Dec. 1993, Issue 97, p. 34-51.
Rao, Srikumar S., "Are your customers being served", The H.W. Wilson Company, vol. 19, Sep. 16, 1997, 1 page.
Harris, Donna, "Internet sales cutting profits from financing, dealers say.", Automative News, v. 71, Issue 5730, Sep. 8, 1997, 1 page.
"Auto-By-Tel Wins With Educated Customers and Low Prices", Interactive Marketing News, vol. 3, Issue 28, Oct. 18, 1996, 1 page.
Autobytel.com Puts Representatives in the Field, Becoming First Online Buying Service to Localize Dealer Support Services, Sinocast, Nov. 5, 1998, 1 page, Irvine, California.
"Automotive Sites Missing Web Ad Opportunities", Electronic Marketplace Report, vol. 10, Issue 22, Nov. 19, 1996, 1 page.
Blumenstein, Rebecca, "On-line showroom Web site information helps buyers drive hard bargains, but car dealer profit, too.", Kansas City Star, Jan. 6, 1998, 1 page.
Embedded Systems Conference Spring advertisement, 1 page.
Conhaim, Wallys W., "Buying cars online.", Link-Up, vol. 15, Issue n5, Sep. 1, 1998, 1 page.
Industrial Distribution News, "GM buying into online auctions", Nov. 1998, http://www.inddist.com, 1 page.
Westlaw Delivery Summary Report for Taylor, David, Dec. 13, 2008, Allnews database, 1 page.
Couretas, John, "Carpoint Web Site Adds Personal Touch: The Plan: Snag and Hold Surfers", Automative News, Nov. 9, 1998, 1 page.
Direct Marketing, "Trading Post Charges $10 for Limited Edition Catalog", Jul. 1983, 1 page.
Online—The Magazine of Online Information Systems, Nov./Dec. 1995, vol. 19—No. 6, 1 page.
S&MM Table of Contents—Jan. 14, 1985, 1 page.
Lee, Ho Geun, "Do electronic marketplaces lower the price of goods?", Communications of the ACM, vol. 41, n1, Jan. 1998, pp. 73-80.
Barua, Anitesh, et al., "Efficient selection of suppliers over the Internet", Journal of Management Information Systems:JMIS, vol. 13, n4., Spring 1997, 1 page.
Online—The Magazine of Online Information Systems, Mar. 1994, vol. 18—No. 2, 1 page.
InformationWeek for Business and Technology Managers—Cover, 1 page.
Natalie Engler, "Emerging Enterprise—Online Opportunity", www.informationweek.com, Jan. 11, 1999, 1 page.
Schenecker, Mark, et al., "Goodbye to old-fashioned EDI", Informationweek, n713, p. 73-88, Dec. 14, 1998, 1 page.
Microsoft CarPoint, Harvard Business School Article, Aug. 21, 2000, 1 page.

(56) References Cited

OTHER PUBLICATIONS

Carpoint in 1999, Harvard Business School Article, Oct. 6, 2000, 1 page.
Carpenter, Maile, "How to play the bidding game", Money, Fall 1998, vol. 1, Issue 2, pp. 70-71.
"Autoweb.com: Industry Leader Autoweb.com Revolutionizes Online Car Buying With Risk-Free Pricing Structure", Jan. 31, 1998, 1 page.
"Briefs", Journal of Commerce, Jan. 13, 1998, 1 page.
"Finet Expands with Knight Ridder.", Mortgage Marketplace, vol. 22, Issue 331, Jan. 4, 1999, 1 page.
"Lycos and AdOne's ClassifiedWarehouse.com Create Online Alliance; The Web's Most Comprehensive Classified Listings Come to Lycos.com", Business Wire, Dec. 2, 1998, p. 1093.
"Microsoft Unveils Carpoint Internet Car-Buying Service", PR Newswire, Jul. 17, 1996, 1 page, Redmond, Washington.
"Navidec Announces 'Wheels' Launches Progress Ahead of Schedule", PR Newswire, Oct. 27, 1997, 1 page, Denver, Colorado.
"Navidec Inc. Announces Third Quarter Results", PR Newswire, Nov. 6, 1997, 1 page, Denver, Colorado.
"Autoweb.com's New Risk-Free Pricing Structure Revolutionizes Online Car Buying Industry", PR Newswire, Feb. 9, 1998, 1 page, Santa Clara, California.
Burton, David, "Paging the Mercury Way", Business Equipment Digest, Jan. 1989, 1 page.
Neuwe, Ellwood I., "Personal Communication in Traditional Cellular Networks", Glenayre Electronics, vol. 2602, p. 184, Duluth, Georgia.
Cooke, James Aaron, "Point, click, and shop.", Logistics Management, vol. 36, n2, p. 70S(3), Feb. 1997.
"Net nightmares.", Chief Executive, Jan. 1, 1998, 1 page.
Cardwell, Annette, "Cyberscene; On-line auction sites are coming on strong", Boston Herald, Jan. 13, 1999, 1 page.
Rafter, Michelle V., "Auto-By-Tel Your On-line Auto Source", St. Louis Post-Dispatch, Aug. 21, 1996, 1 page.
"Retain advertising and catalogs.", Seybold Report on Publishing Systems, vol. 23, n16, May 10, 1994, p. 56(6).
Naughton, Keith, et al., "Revolution in the Showroom: Finally, consumers are in the driver's seat—and pushy dealers look like dinosaurs", Business Week, No. 3463, Feb. 19, 1996, p. 70.
Stevens, Tim, "Set sale on the 'Net. ", Industry Week, vol. 246, n8, Apr. 21, 1997, p. 56(7).
Henry, Ed, "The Virtual Car Buyer", Sending: On-Line Finances, Sep. 1995, 1 page.
Nauman, Matt, et al., "The Virtual Showroom Car Shopping on the Web", San Jose Mercury News, Feb. 7, 1997, 1 page.
Marketing Communications Contents, vol. 14, No. 5, May 1989, 1 page.
Choudhury, Vivek, et al., "Uses and consequences of electronic markets: An empirical investigation in the aircraft parts industry", MIS Quarterly, vol. 22, n4, Dec. 1998, pp. 471-507.
"Want to buy a new car?" Dec. 14, 1998, 1 page.
"What car? TV Limited: What car? Online and What car? Text boost manufacturer and dealer sales leads", M2 Presswire, Aug. 31, 1998, 1 page.
Little, Thomas, "Commerce on the Internet", IEEE Multimedia, 1994, 1 page.
Wiley, John & Sons, "The Extended Sales Enterprise: The Next Generation of Customer Management Automation", Khandpur & Wevers, 1998, 1 page.
"Sales Team Application", Integrated Sales & Marketing, 1996, 1 page.
AutoWeb.com, AutoWeb Interactive, On or before Jan. 13, 1998, 1 page.

\* cited by examiner

Fig. 2

RANKING SYSTEM USING INSTANT POST-TRANSACTION SURVEYING OF TRANSACTION JUDGES

CLAIM OF BENEFIT

The present application is a continuation-in-part of U.S. Ser. No. 11/207,571 filed Aug. 19, 2005 and benefit thereof is claimed to the extent permitted by law. The latter parent application relates back to the following U.S. provisional application 60/603,442 (filed Aug. 19, 2004); 60/610,470 (filed Sep. 15, 2004); 60/637,231 (filed Dec. 17, 2004); and 60/674,868 (filed Apr. 25, 2005). Benefit of the still copending 60/674,868 is further claimed here to the extent permitted by law.

FIELD OF DISCLOSURE

The present disclosure of invention relates generally to survey taking. The disclosure relates more specifically to automated taking of surveys in a fast changing, real time interactive situation where the query targets of the survey are human transaction evaluators who may be busy processing many incoming real time transactions.

CROSS REFERENCE TO CO-OWNED APPLICATIONS

The following copending U.S. patent applications are owned by the owner of the present application, and their disclosures are incorporated herein by reference:

(A) Ser. No. 11/207,571 filed Aug. 19, 2005 by Marc Diana and Per Pettersen and which was originally entitled, System for Implementing Automated Open Market Auctioning of Leads; where said Ser. No. 11/207,571 was copending and referenced the following U.S. provisional applications: 60/603,442 (filed Aug. 19, 2004); 60/610,470 (filed Sep. 15, 2004); 60/637,231 (filed Dec. 17, 2004); and 60/674,868 (filed Apr. 25, 2005).

DESCRIPTION OF RELATED ART

Many techniques exist for obtaining survey results from human subjects. Surveys tend to be intrusive and consuming of the subject's time as well as attention.

There are situations in which a targeted subject of a survey is too busy, has too little time to participate and/or has limited recollection of relevant events so as to accurately and fully participate in a given survey and therefore survey results are not readily obtainable from such a targeted subject. If the statistically relevant subjects of a given survey predominantly tend to be the too busy ones, the ones with little time to participate and/or the ones with limited recollection, then survey results may be inaccurate or unreliable or almost impossible to get.

One specific area of endeavor where such survey-taking problems exist is in human-to-human fast-changing real-time interaction situations where potential survey targets are busy processing many real time voice transactions and thus have little in-between time for participating in intrusive surveys. More specifically, one area of particular interest is that where the query targets of a given survey are people who process so-called hot-contact customer market transactions. These are transaction situations that start with a potential, and possibly impatient, customer hanging on in live time on a telephone line or on a like other voice and/or video connection waiting for a human transactor (e.g., telephone operator) to pick up the call and conduct a business transaction. It is desirable for a human transactor to pick up the waiting connection in a matter of few seconds or minutes (e.g., less than 2 minutes) so as not to risk losing or offending the customer. After the transactor (e.g., telephone operator) finishes with a first on-the-line live interaction, it is often desirable for the transactor (e.g., telephone operator) to move on quickly to picking up and processing a next awaiting live call. Time between incoming calls can be very limited and the recollection of the transactor regarding details of one live interaction after the other can quickly fade. As such, survey efforts directed at gathering impressions of such busy participants in the hot-customer/transactor market space run into significant hurdles. It may not be possible to collect any meaningful survey results with conventional techniques.

SUMMARY

Structures and methods may be provided in accordance with the present disclosure of invention for improving over the above-summarized shortcomings of conventional surveying methods as directed to transactors in hot-contact transaction situations.

More specifically, in accordance with one aspect of the present disclosure, techniques are provided for allowing one or more of the following machine-implemented processes to take place: (a) automatically detecting a hang-up by one of plural transactors involved in a hot-contact telecommunication interaction; (b) automatically maintaining or re-establishing connection with a transaction-evaluating one of the transactors; (c) automatically presenting a survey question to the transaction-evaluator regarding the just-concluded hot-contact interaction; (d) automatically collecting the evaluator's response, if any, and associating the response with at least an identification of the just-conducted interaction, if not other interaction-related data; (e) forwarding the response and associated interaction-related data to a database which stores and processes plural ones of such post-hot-contact responses; and (f) using the database to manage future transactions based on plural responses obtained by step (e) for plural ones of recently concluded hot interactions.

A data processing system in accordance with the present disclosure comprises one or more of: (a) hang-up detect means for automatically detecting a hang-up by at least one of plural transactors involved in a hot-contact telecommunications interaction; (b) means for automatically maintaining or re-establishing connection with a transaction-evaluating one of the transactors; (c) survey presenting means for automatically presenting at least one survey proposal to the transaction evaluator regarding the just-conducted interaction; (d) response collecting means for collecting one or more of the evaluator's responses, if any, and for associating the one or more responses with at least an identification of the just-conducted interaction, if not other interaction-related data; (e) transmitting means for forwarding the interaction-related data to a database for storage and processing by the database; and (f) a transactions manager that uses the database to manage future transactions based on plural responses obtained by the database regarding plural ones of conducted hot transactions.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
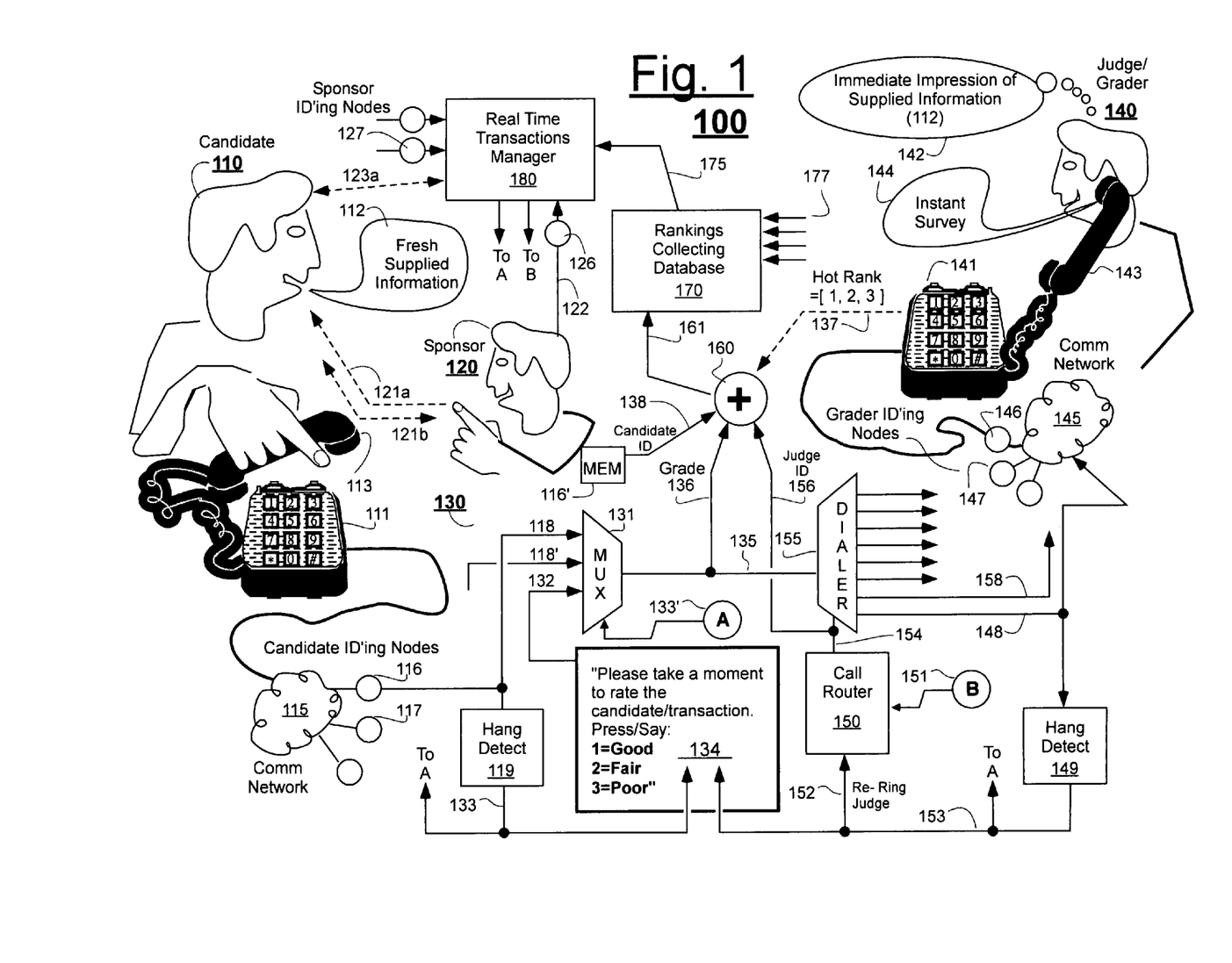
FIG. 1 schematic diagram showing an instant-survey taking system in accordance with the invention.

FIG. 1 is a schematic block diagram of a real-time transactions processing system 100 in which the here disclosed invention may be applied. The primary human participants or transactors in the illustrated example are referred to as a candidate 110 and a judge or grader 140. FIG. 1 shows the candidate 110 in a state where the candidate has just been engaged in a live (and possibly at times "on hold") telephone conversation 112 with the judge 140 and now the candidate 110 is in the process of terminating the telecommunications connection by hanging up the receiver portion 113 of the telecommunications device 111 which the candidate used to conduct the just-concluding interaction.

FIG. 1 shows the judge/grader 140 in a state where the judge still has the receiver portion 143 of his counterpart communications device 141 at his ear. The judge/grader 140 is politely waiting an extra second to hear the hang-up click from the candidate's side because, in some cultures, it would be considered rude for the judge 140 to hang-up on the candidate. Perhaps the candidate has a last moment question to ask of the judge and judge wants to make himself available for helping the candidate conclude the interaction in a mutually satisfying way.

Although telecommunication devices 111 and 141 are shown in FIG. 1 as simple, push-button tone-based telephone sets, other types of voice and/or multimedia carrying communications devices may be used, including but not limited to, analog or digital cellular wireless telephones, satellite link telephones, and various mobile telecommunication and/or computing devices (e.g., PDA's or personal digital assistant devices) that come with voice transceiving capabilities. Shortly before the illustrated, hanging-up state of the candidate 110, a bidirectional telecommunications connection had been established between the candidate 110 and the judge/grader 140 (due to action by either one of them and/or due to action by a third party "sponsor" 120 and/or due to action by an automated transactors manager 180) and an interview was carried out between the candidate 110 and the judge/grader 140 in which the candidate supplied information 112 to the judge/grader 140, perhaps in response to questions asked by the judge/grader 140. At the conclusion of the interaction (e.g., interview), the candidate 110 usually terminates (113) his part of the bi-directional communications connection first while the judge/grader 140 remains momentarily on-line for any one of a number of possible reasons. It could be a matter of simple cultural deference that the judge/grader 140 waits for the candidate to hang up first. Or perhaps the judge/grader is involved in jotting down some last minute notes regarding the just-concluded interaction onto paper and/or into a computing device (not shown). No matter what the specific reason is, the judge/grader 140 will usually remain on-line for at least a split second longer than the candidate.

At the moment when the candidate 110 hangs-up (113), and the judge/grader 140 is still perhaps jotting down some last minute notes (not shown), the judge/grader will usually have a fresh and immediate impression 142 of how the just-concluded interaction went based on the information 112 just supplied by the candidate. Before the judge 140 can terminate his portion of the telecommunications connection, e.g., by hanging up his receiver 143 (or taking equivalent action), the system 1000 automatically takes control of the still alive communications channel (after the candidate 110 has been essentially decoupled from that channel) and the system presents an auditory survey proposal 144 to the judge 140, by for example, asking the judge 140 to help with improving performance of the system by taking an extra moment (e.g., just an extra 2 seconds) to rate the candidate and/or transaction that just took place. The system may ask the judge 140 to do so by pressing an appropriate touch-tone button on his communications device 141 or by responding verbally into the receiver 143 (and/or by responding via a survey menu flashed onto the judge's computer screen—not shown). An example of such a machine-presented, auditory request may proceed as follows: "Please help us improve our system by rating this concluded transaction. It will take just a second. Press 1 or say "Good" if you rate the interaction as having been good. Press 2 or say "Fair" if you rate it as fair. Press 3 or say "Poor" if you rate it as poor. Thank you for your help." The entire survey and response cycle may take as little as a second or less if the judge 140 has been preconditioned by previous use of the same system 100 to know what the survey question will be and what the response buttons mean. In such a case, the judge 140 does not even need to bother to listen to the whole survey proposal 144. He can quickly press 1, 2 or 3 (or say "Good", "Fair", "Poor"—thus not needing use of his hands) and then immediately hang up. The whole process may unobtrusively consume no more than 1-3 seconds of his time. To expedite the process, a pre-selected musical background piece may be simultaneously played as the verbal part of the survey proposal is presented. After a few exposures, the judge/grader 140 will usually come to recognize the musical background melody as an indication that the candidate 110 has hung-up and that presentation of a particular survey proposal 144 is now beginning. Different musical melodies may be used to signal the beginnings of different survey proposals.

Even if a given judge 140 is new to the system 100 and is listening to the entire survey proposal 144 for a first time, the question and response sequence can be structured to consume only a few seconds of the grader's time. By this means the system is able to immediately gather the grader's fresh impression 142 at the end of the telephone conversation and before the grader 140 jumps on to a next telephone call. Of course the specific message 134 that is audibly played and/or otherwise presented during the taking of the instant survey 144 can vary from application to application. For example, the specific message 134 may include an additional option of pressing 9 to rehear the menu again and may allow for presentation of additional survey questions if the grader is so inclined at the moment to take on more questions. The system may offer rewards for graders who agree to respond to more questions or listen to longer, addendum messages (e.g., tagged on advertisements). The system may automatically enable the grader 140 to permanently or temporarily opt out from being bothered by this specific type or by all survey proposals; and/or to opt in to receiving longer surveys with associated rewards. This enablement can come as one of the additional response options presented to the listener. For example, "If you are interested in receiving extra reward points, press the star (*) button or say Rewards."

It is seen from the above that a relatively instantaneous post-transaction surveying method is disclosed herein whereby the interviewer or grader 140 need not be bothered for more than just a short amount of time immediately after an interview completes. The method allows the response collector (160 in the illustrated example) to get the grader's 140 fresh and immediate impression 142 of how well the just-concluded interaction 112 proceeded or not. If the grader 140 is too busy at the moment due to heavy call traffic, he can simply hang up and not respond. The system 100 may take note of the grader's non-response pattern and automatically place the particular grader on a temporary, do-not-disturb list for, say an hour, or for certain, known-to-be-busy hours of the day associated with that trader/grader 140. Thus the obtrusiveness of the automated survey-taking activities of the system can be automatically tailored so as to not bother graders 140 who are too busy to be bothered during certain time periods and/or to not bother graders 140 who indicate they do not want to ever be bothered again.

Turning to the exemplary details shown in FIG. 1, the candidate's communication device 111 operatively couples to a telecommunications network 115 (e.g., to a telephone system and/or to the internet). The candidate's communication device 111 includes contact navigation means such as a set of touch-tone push buttons for specifying a target communication node 116, 117, etc. to which the communications network 115 will connect the device 111 as the candidate initiates a telephone call or has a teleconference connection established for him by automated means (e.g., by transactions manager 180). In the illustrated example, the candidate 110 has established on his own, or has had established for him, a live connection to communications node 166 on the other side of network 115. A call-intercepting and routing system 130 is interposed between communication networks 115 and 145. More specifically, the call-intercepting and routing system 130 is operatively coupled to nodes such as 116-117, where the candidate-side calls ingress from network 115 and the system 130 is operatively coupled to grader-side communication nodes such as 146-147 where the call connection continues towards coupling (e.g., via network 145) with a given grader's communication device 141. In the instant example, the grader's communication device 141 has been operatively coupled to node 146. Like network 115, the grader-side network 145 may be a navigate-able one such as one that uses the public telephone switching system and/or the internet. Telecommunications between the candidate 110 and judge/grader 140 may be carried over secured channels (e.g., encrypted channels) or not as warranted by a given application.

A voice-message carrying multiplexer 131 selectively couples the candidate's side 118 of the established communication channel to an automated dialer 155 via an intermediate channel 135. Unconnected line 118' represents another voice-message carrying line that multiplexer 131 can later select and thereby operatively couple another call to intermediate channel 135. That other call can be from a second candidate (110' not shown) different from the illustrated first candidate 110. The dialer 155 couples the multiplexer-controlled intermediate channel 135 via further line 148 and communications network 145 to node 146, which node connects to the grader's telecommunication device 141. The grader 140 and first candidate 110 then converse regarding a given transaction that is being proposed or is ongoing.

At the end of the conversation, typically the candidate 110 will hang up first while the grader 140 remains on-line as shown. A candidate-side hang-up detector 119 detects the hang-up event on the candidate-side line 118 and reports the event to multiplexer 131 by way of the "A" control node 133'. This causes multiplexer 131 to maintain the connection along the intermediate communications channel 135, but to selectively couple an automated survey-conducting device 134 to the intermediate communications channel 135 in place of the hung-up, first candidate connection 118. The survey-conducting device 134 then automatically injects a predefined survey message signal 132 into that communication channel 135 as triggered by the event detection action of hang-up detector 119. The injected survey message 132 may include a musical background melody and a brief foreground voice-over such as is shown in box 134, namely, "Please take a moment to rate the candidate and/or transaction by pressing or saying: 1=Good, 2=Fair, and 3=Poor." Since the grader 140 has not yet hung up on his side of the established channel, the grader hears the presentation 144 of this instant-survey request immediately after having communicated with the given first candidate 110 and while the impression 142 gathered from that first interaction 112 is still fresh in the grader's mind. The judge/grader 140 can then simply press one of the touch-tone buttons labeled as 1, 2 or 3 (or speak his response) to thereby quickly respond to the survey request and the judge/grader 140 can then hang up. Thus it may take only a few seconds of the judge's time, if that much, to understand what (144) is being asked of the judge and to respond appropriately. The judge/grader 140 will not have to later search through his mental recollections and/or jotted down notes as the judge might otherwise have to do if later asked to recall each of a many conversations with different candidates (110, 110', 110", only one shown) that took place during a given day so that the judge 140 can grade (rate, rank) each one properly. The short, instant survey 144 is immediate and much less intrusive than one that calls for the judge to pull up information that has already been stored away on his computer and/or one that asks the judge to fill out long and complicated web-based survey forms.

In one embodiment, the auditory presentation shown in box 134 of FIG. 1 is alternatively or additionally displayed as a visual pop up menu on the judge's/grader's 140 computer screen. (Item 134 of FIG. 1 may then be considered as also representing the visual pop up menu that is activated on the judge's/grader's 140 computer screen.) The instant survey method accordingly may include the auditory and/or visual providing to the judge/grader 140 of at least a first list of response actions (e.g., 134) which the judge/grader 140 may employ to respond to a proposed first survey inquiry. In addition to pressing telephone keypad buttons or speaking his response, the judge/grader 140 may be provided with the option of using a mouse-driven cursor or other computer-controlled means for selecting from among presented menu items.

In one embodiment, the presented survey options are divided into at least five (5) responses rather than the simple three (e.g., 1=Good, 2=Fair, 3=Poor) shown in box 134. In one embodiment, the judge/grader 140 is trying to process loan applicants and each candidate (e.g., 110, 110', 110") is a person who might be interested in having a loan application filled in and filed on his behalf. In the latter case, the at least five (5) response options presented to the judge/grader 140 may include: 1=Excellent (the candidate filled in the loan application and qualified for the loan); 2=Good (the candidate filled in the loan application but has not yet qualified for a loan); 3=Fair (the candidate did not fill the loan application but nonetheless remains interested in continuing with the process and requires a follow up); 4=Mediocre (the candidate changed his mind and is no longer interested in continuing with the process); 5=Misdirected (the candidate was not even interested in a loan application of this type (the judge's specialty) and was looking for some other service or product, and therefore both the candidate and judge had their time wasted by the referral—i.e., one provided by an identifiable "sponsor" 120). For persons skilled in the art of loan processing, the above five responses may be abbreviated to something of the following nature: 1=Converted; 2=App Completed; 3=Interested Customer; 4=Customer Changed Mind and 5=Wrong Product.

Although FIG. 1 shows hang-up detectors at 119 and 149 (e.g., ones that detect analog termination tones), it is within the contemplation of the disclosure that other forms of indication can be detected that interaction has concluded at least at one end of the telecommunications link. By way of example, the telecommunications link may be a packet switching one at the point where system 130 comes into play and termination of interaction may be encoded by a prespecified EOM (end of message) code or by a prespecified sequence of codes, this varying from application to application. The hang-up detectors 119, 149 are representative of appropriate detectors for indications of termination of interaction as may be appropriate in different telecommunications environments.

In one embodiment, the following CaIIXML code sets are used to automate detection of termination and collection of response:

```
1. <sendevent value="Success" session="$ParentSessionID;"/>
2. <wait value="1s"/>
3. <log value="*** CHILD SESSION IS STILL HERE ***"/>
4. <goto value="/voice/conferenceEndedWithFeedback.ilp" submit="*"
  method="get"/>
```

Wherein above Line "1." sends a message to the parent CaIIXML session that is responsible for conferencing together the judge and the candidate. After the candidate hangs up (detected by a CaIIXML On-HangUp conditional goto) the program continues on line 2 with a short predefined delay and then submission of the survey proposal and collection of response data. An example of such proposing and collection follows:

While FIG. 1 implies that the hot ranking signal 137 provided by the judge 140 moves directly from his telephone 141 into the response collecting and combining node 160, that is not technically precise. Instead the hot ranking signal 137 will usually traverse back through the already-established communications path, namely through node 146, network 145, line 148, dialer 155 and back to intermediate connection channel 135. The hot ranking signal 137 will then proceed into combining node 160 via path 136 as a so-called, grade signal (also denoted as signal 136). The specific routes that various pieces of data take on their way to being logically associated with one another and fed to database 170 may vary from one implementation to the next. Combining node 160 logically combines the grade signal 136 together with a judge identifying signal 156 and a candidate identifying signal 138 obtained from memory 116'. This combined information is communicated alone or with yet further survey-related information from the combiner 160 by way of path 161 to a rankings collecting database 170 for further processing in the rankings collecting database 170. One of the processes automatically conducted by the rankings collecting database 170 may be to group together responses of a given one judge 140 and/or responses of a predefined group of judges. Another of the processes automatically conducted by the rankings collecting database 170 may be to group together grades given to one particular candidate 110 and/or grades given to a predefined group of candidates. Group related processing may

```
<?xml version="1.0" encoding="UTF-8" ?>
<callxml version="2.0">
        <assign var="leadid" value="$leadid"/>
            <block repeat="3" label="feedback">
                <playaudio
value="/voicedata/${model.execution.voiceNetworkSettings.buyerFeedbackMe
ssage.id}.wav" termdigits="12345"/>
                <wait termdigits="12345" value="15"/>
                <ontermdigit value="1" maxsilence="15000">
                    <!-- Converted Customer -->
                    <assign var="feedbackCode" value="108"/>
                    <goto value="/voice/feedback.ilp"
                        submit="*"
                        method="get"/>
                </ontermdigit>
                <ontermdigit value="2" maxsilence="15000">
                    <!-- converted to app -->
                    <assign var="feedbackCode" value="107"/>
                    <goto value="/voice/feedback.ilp"
                        submit="*"
                        method="get"/>
                </ontermdigit>
                <ontermdigit value="3" maxsilence="15000">
                    <!-- interested -->
                    <assign var="feedbackCode" value="99"/>
                    <goto value="/voice/feedback.ilp"
                        submit="*"
                        method="get"/>
                </ontermdigit>
                <ontermdigit value="4" maxsilence="15000">
                    <!-- changed mind-->
                    <assign var="feedbackCode" value="100"/>
                    <goto value="/voice/feedback.ilp"
                        submit="*"
                        method="get"/>
                </ontermdigit>
                <ontermdigit value="5" maxsilence="15000">
                    <!-- wrong product -->
                    <assign var="feedbackCode" value="102"/>
                    <goto value="/voice/feedback.ilp"
                        submit="*"
                        method="get"/>
                </ontermdigit>
            </block>
</callxml>
``` include statistical analysis for derivation of mean and sample variance indicators. More specifically, one predefined group of candidates may be logically associated with an identified sponsor 120 and the aim of the database may be to statistically analyze recent behavior of the sponsor with regard to certain types of candidates and/or certain types of judges and/or certain types of interactions. More on this shortly.

First, an explanation is provided as to how a given judge's ID signal 156 and a corresponding candidate's ID signal 138 are generated and logically linked to one another. The judge's identification (156) is known because an automated call router 150 operated the dialer 155 to complete a telephone call (in one embodiment) to the judge 140 by way of dialer-accessible telecommunications line 148 and communications switching network 145. At least one of the call router 150 and dialer 155 stored a telephone number uniquely associated with judge node 146 and perhaps also the time and date when the connection was made and the duration of the connection. The telephone number can be used alone or with the other stored data as the judge's ID signal 156. Alternatively, another unique identifier might be mapped from the telephone number and used as the judge's ID signal 156. The mapped identifier might include information about the date, time and/or duration of the call as well as about the identity of the judge/grader 140. Not all judges/graders 140 need to be the same. Some may have expertise in certain kinds of interactions (e.g., home loan applications, automobile leasings) that other judges do not handle. Accordingly, a system 100 may be used not only by different individual judges, but by different classes of judges. The judge's ID signal 156 may reflect the judge's category of expertise (product specialty) as well as the judge's individual identity.

Just as the dialed out-to, target node 146 serves (alone or in combination with other information such as time and/or date and/or judge category) as a means for uniquely specifying the judge's identification, the identity of the dialed in-to, receiving node 116 serves (alone or in combination with other information such as time and/or date and/or candidate type) as a means for uniquely specifying the candidate's identification. While the connection with candidate 110 is intact, memory 116' stores the identification of the inbound node 116 and of the date, time and/or duration that the node 116 is being used for the voice-mediated interaction (112-142) between the specific candidate 110 and one or more judges/graders 140 at the other end. This candidate-side node identifier and associated time information can be combined to produce the candidate's ID signal 138, or another unique identifier might be mapped therefrom. In practice, a calls-receiving center may have hundreds of receiving nodes like 116-117 that are uniquely rolled through over the course of a day or week and the node identification in combination with day or week may be sufficient to uniquely identify the associated candidate 110. In one embodiment, unique subsets of the receiving nodes 116-117-etc. are assigned to different sponsors (e.g., 120) and the sponsor of a given candidate is thus identified by the unique subset in which the candidate's call was received. Alternatively or additionally, the candidate may be asked to key-in a unique transaction code via his keypad (111) and the latter code may be used alone or in combination with other data to identify the candidate 110 and/or his/her sponsor. In some calls-receiving centers, certain subsets of the large pool of receiving nodes like 116-117 may be reserved for different categories of candidates (e.g., those looking to refinance their homes versus those looking to lease a new car versus those looking to buy a used car). So the identity of the used, candidate node 116-117 may provide more information than merely identifying the route taken for the candidate's call.

Before proceeding to operations of the rankings collecting database 170, in some embodiments it is possible for the judge/grader 140 to terminate his end (146) of the communications connection before the candidate 110 does so. In such a case, an optionally-included, judge-side hang-up detector 149 detects this event as signaled over line 148, and in response actuates multiplexer 131 so as to cause multiplexer 131 to maintain the connection along the intermediate communications channel 135, but to attach the survey-conducting device 134 to the communications channel 135 in place of the candidate connection. (The first candidate's connection into the system may be terminated or placed on hold at this time, the specific choice of action varying from application to application.) Since the judge/grader 140 has hung-up, the judge-side hang detector 149 instructs the call router 150, via connection 152 to redial and reconnect to the judge/grader 140. At least one of dialer 155 and router 150 still remembers the telephone number of, and/or other navigation path through network 145 to reconnect to the judge/grader 140. If the judge/grader 140 picks up within a prespecified time limit (e.g., 30 seconds), the survey-conducting device 134 is activated to then automatically inject the survey message signal 132 into the reestablished communication connection by way of still active communication channel 135. If the judge/grader 140 does not pick up within the specified time limit, the system treats it as a refusal to respond to the survey and sends a corresponding, survey-refused indication to the database 170 together with information identifying the respective judge/grader 140, candidate 110 and time of interaction.

The collected hot-ranking data 136/137, together with other information that indicates the candidate ID (138), the judge ID (156), the time of interaction (specific signal not shown), the communication pathway used (specific signal not shown), and/or other useful data are communicated from the combiner 160 by way of path 161 to the rankings collecting database 170. It is to be understood that the collected instance 161 of hot-ranking data 136/137 and associated interaction identifications is but one of many similar hot-rankings being transmitted in essentially real time (e.g., within a few seconds after collection) into the database 170 for storage and further processing. The rankings collecting database 170 may collect other kinds of quality-of-interaction defining signals along other feedback lines such as 177. Rating, grading or quality feedback signals provided on feedback lines 177 may be of a more delayed and thus staler kind rather than real-time feedback instant survey results (136/137). The staler feedback signals (177) may be generated off of web-based survey forms that judges/graders 140 are asked to review and fill out long after a hot contact interaction is terminated (e.g., more than 60 minutes after contact termination, or more than 24 hours after termination, depending on types of interactions). Because they are staler than the hot-ranking feedbacks (136/137), the other feedback signals (177) may not provide an as accurate picture of recent behavior by users (e.g., 110, 120, 140) who are using the system 100. The rankings collecting database 170 may employ various weighting algorithms for determining how to define an effective "recent" performance for different combinations of different kinds of users. These weighting algorithms may be empirically defined based on application by application specifics. By their nature, different kinds of interactions will have different effective decay times and decay rates for when they cease to be useful. Hot rankings 136/137 will be generally considered very reliable because they are an essentially immediate form of feedback and there is essentially no worry of confusion regarding which transaction the judge is grading or how good his recollection was at the time of response. Moreover hot rankings 136/137 provide a very fast real-time feedback to the system of the immediate impressions 142 of various judges across the system as they receive calls from various candidates and evaluate the conversations 112 and or other interactions or transactions involved.

The rankings collecting database 170 feeds its results 175 to a real-time transactions manager 180. The transactions manager 180 couples to the candidate-side multiplexer selection control by way of connection "A" (133'). The transactions manager 180 couples to the call router 150 by way of connection "B" (151). The two control couplings, "A" (133') and "B" (151), instruct the multiplexer 131 and dialer 155 respectively on which next pair of candidate 110' (not shown) and judge/grader 140' (not shown) will be connected together for a next interaction across intermediate channel 135. In one embodiment, large numbers of candidates 110, 110', 110", etc. (only one shown) are proposing to interact with the system 100 via telecommunications network 115. A smaller, but still relatively large population of judges/graders 140, 140', 140", etc. (only one shown) are proposing to interact with the system 100 via telecommunications network 145. So-called sponsors 120 may be offering their input (e.g., 121a) regarding which candidates might be worthy of consideration by which judges or classes of judges. The sponsorship inputs from the sponsors 120 may enter the transactions manager 180 via one of networks 115, 145 and corresponding node 126. Line 122 represents a bidirectional communications channel established between sponsor 120 and transactions manager 180. Node 120 is yet another connection node used by another sponsor. Sponsors may compete with one another for recognition by the transactions manager 180 and/or for access to different pools of candidates and/or different groups of judges. Based on the real-time collected, hot-rankings 161, etc. and/or the more decayed and staler types of feedback signals 177, the transactions manager 180 automatically determines how to operate control couplings, "A" (133') and "B" (151), and to thereby establish live interaction opportunities between automatically matched pairs of candidates 110, 110', etc. and judges/graders 140, 140', etc. In one embodiment, the judges/graders 140, 140', etc. pay money for the interaction opportunities and thus have a vested in interest in assuring that the system provided opportunities are of sufficient quality to merit the time and money they invest in them. Thus, there is great incentive for the judges/graders 140, 140', etc. to want to honestly participate in the instant surveys 144. The instant surveys 144 may be used to quickly weed out bad candidates and/or sponsors (e.g., sponsors who provide fraudulent or low quality referrals 121a, 121b) and thereby rapidly improve the quality of the interaction opportunities that the system 100 provides to the judges/graders 140, 140', etc.

In one embodiment, the database output rankings 175 are not necessarily ratings of the candidates 110 themselves but rather ratings of the sponsoring persons or organizations 120 who referred to candidates 110 to the judges 140. Sponsors 120 who generally provide candidates of high quality tend to receive relatively favorable reviews, when statistically correlated, from most of the judges who grade their respectively sponsored candidates. Sponsors who alternatively provide very poor candidates tend to receive grades of statistically lower value from the pool of graders 140 who judge their sponsored candidates. In one embodiment, the sponsors are so-called lead-selling organizations or persons who are attempting to sell the identities of, or hot contact connections to, the candidates 110 for purchase by lead-buyers. A randomly and/or otherwise sampled subset of the lead-buyers (or of agents who work for the lead buyers) are asked to act as hot-ranking judges 140 work for the lead-buyers. In one embodiment, the sampling is skewed to more often pick hot-ranking judges 140 whose previous rankings historically correlated strongly to the mean of previous surveys. In one embodiment, measures are taken to not overburden the more often sampled judges with instant surveys by assuring that at least a predefined minimum delay is maintained between successive survey proposals presented to such more often sampled judges.

The system-selected judges 140 evaluate the merit of each lead bought from corresponding sponsors 120 and feedback the corresponding rating to the database 170 as a hot ranking signal 161. Sponsors 120 who consistently provide leads with high evaluations are rewarded in one way or another, for example, by receiving more opportunities to sell their leads or higher monetary enumerations for selling their leads. By contrast sponsors 120 who are statistically found by the database 170 to consistently sell poor leads are punished by the system by being locked out more often from participating in the system and/or by being compensated at a lower rate for their poor quality lead submissions. The buyers 140 are offered differentiated opportunities to buy only high quality leads or mixed combinations of leads. The system charges more for the higher quality leads and compensates the lead-providing sponsors 120 accordingly.

Since the sponsors 120 connect to the real time transactions manager 180 by way of unique communication nodes such as 126, 127 and/or the sponsors are forced to log-in to the system with unique passwords and/or other credentials, the sponsors are identified by unique identification codes that the system logically links to their correspondingly referred candidates 110. In one embodiment, one range of candidate nodes 116-117 is logically associated with a first sponsor 120 while a next range of candidate nodes 116'-117' (not shown) is logically associated with a next sponsor 120' and so forth. When a given candidate 110 calls in through a given range of candidate nodes 116'-117', the node identification automatically associates that candidate with a specific sponsor. The system can then evaluate sponsors 120 by virtue of the grades given to their sponsored candidates 120.

Because the hot ranking feedback 137 is relatively instantaneous and immediate, sponsors are rewarded or punished for their immediate behavior in accordance with survey information that is gathered on an essentially real-time basis from system-selected and participating judges 140. Judges cannot easily game the system because the instant survey 144 generally samples the judge population on a random basis. Such a real-time and fairly run surveying system can provide better results than ones produced by surveying systems that rely on stale responses, namely ones where there is a substantial lag or delay between sponsor behavior and system recognition of that sponsor behavior as being good or bad. Once sponsors learn that the system 100 behaves in this way, bad sponsors will shy away from using the system 100 (because their fraudulent behavior is uncovered fairly rapidly) and more good sponsors will be drawn to using system 100 (because their good behavior is also uncovered fairly rapidly, and more so because it is not polluted by the bad-apple-in the-barrel behavior of unrecognized bad sponsors). Once the potential judges/graders (e.g., lead buyers) 140 come to realize that system 100 is rapidly weeding out the bad sponsors and drawing in more of the good sponsors, those potential judges/graders who are looking for high quality candidates 110 will be drawn toward using this real-time feedback driven system 100 more so than systems that do not provide selection based on real-time quality feedback.

In one embodiment, a leads marketing system using the instant survey concepts illustrated herein offers the following advantages. Unlike conventional hot-contact transfer solutions that try to consistently sift through piles of old and stale leads and to make undifferentiated outbound calls based on these piles in an effort to locate still-interested consumers who would be willing to be hot-transferred to lead buyers, the leads marketing system of the embodiment offers lead buyers, hot-transferred voice leads that are:

1. Pre-Qualified—because its supplied candidates are consumers who responded to one or both of online and offline advertisements and were forced to complete mortgage-specific questionnaires (e.g., by using IVR-interactive voiced choices and responses) and responses to these pre-qualifying questionnaires were used to confirm immediate product interest;
2. Fresh—because less than 90 seconds on average was consumed between the time the potential consumer called the service-provider's controlled toll-free telephone number (e.g., a 1-800 number) and the potential consumer responded to the IVR-driven questionnaire and the potential consumer was hot-contact wise connected to a matching lender;
3. Automatically Segmented—because the combination of draw-in ads and IVR-driven questionnaires were structured to cause the potential consumers to provide in essentially real time, the following information which is used to filter-wise match potential consumers with appropriate lending specialists based on:
    3a. Mortgage Product Type (e.g., Refinance, Home Equity or Home Purchase);
    3b. Geographic location (e.g., State in which the property is located)
    3c. Desired Loan Amount
    3d. Self-Assessed Credit Rating (Good, Fair or Poor)

Additionally, instant survey feedback is used evaluate the draw-in paths and/or sponsors through which these pre-qualified, product typed, value-categorized and self-rated potential customers are brought into the system so that hot-transferred voice leads that are currently coming in from higher valued, draw-in channels can be differentiated from those currently coming in from lower rated, draw-in channels.

Figure 2:
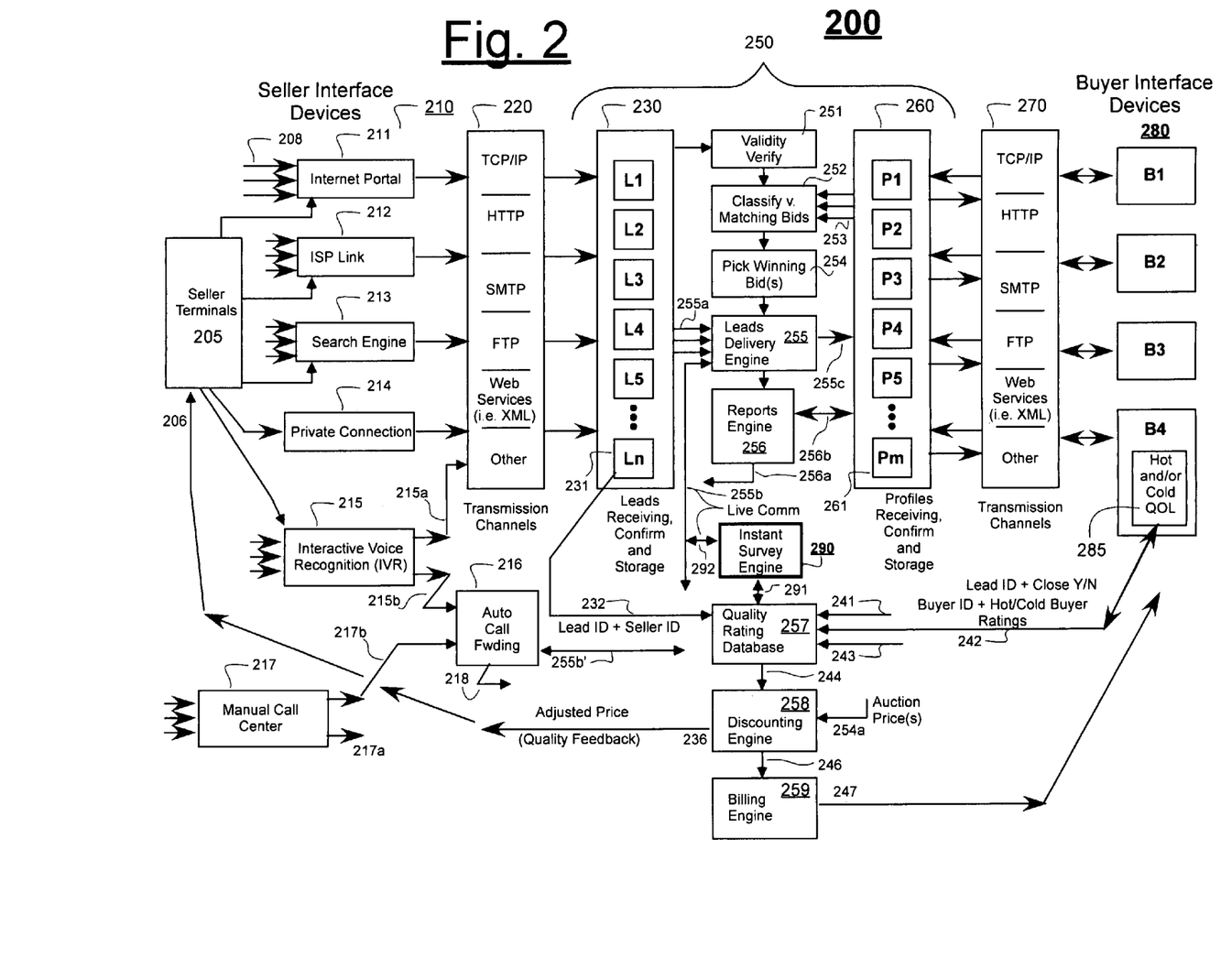
FIG. 2 is diagram showing a possible coupling of an instant surveying subsystem into an automated auctioning system.

Referring to FIG. 2, in one embodiment, the instant surveying system is incorporated into an automated leads auctioning system 200 such as the kind disclosed in the above cited, U.S. Ser. No. 11/207,571 (System for Implementing Automated Open Market Auctioning of Leads). The more notable feature of FIG. 2 is the inclusion of the instant survey engine 290 which is operatively coupled (292) to the live telecommunications pathways 255b and also operatively coupled (291) to the quality rating database 257. Many of the other aspects of the present FIG. 2 correspond to like numbered elements of FIG. 4A of said U.S. Ser. No. 11/207,571.

In the illustrated schematic block diagram of the bids-and-leads processing system 200, lead sellers are understood to be supplying their information from the left while buyers supply their information from the right. Sellers may use various, seller-side interface devices 210 for communicating with a core portion 250 of the system 200. Buyers may use various, buyer-side interface devices 280 for communicating with the core portion 250. System features used in the seller-side interface devices 210 will often differ from those used in the buyer-side interface devices 280 since the two groups of system users have different goals. However, it may be advantageous to provide integrated buy-and-sell software to all users, installed in their respective interface devices (210 and 280), and let them decide when they want to operate as buyers and when as sellers of leads for various products.

Some types of sellers rely on so-called Internet portals 211 for attracting large numbers of prospective consumers 208 to their web sites so as engage the attracted visitors with the possibility of converting their visits into generated leads for various, sponsoring products. Some types of sellers provide ISP service sites 212 and thereby attract large numbers of prospective consumers so as engage the visitors and convert the visits into leads. Examples of other prospect attracting mechanisms include but are not limited to: provision of free search engine services 213, web directories, special content sites and so forth. Leads might also be generated and captured in automated and/or manually operated telephone call centers and/or by regular mail solicitations.

FIG. 2 shows an automated call processing unit at 215 and a manual call processing center at 217. Each of the automated and manual call processing means (215, 217) couples to an automated call forwarding unit 216. So-called, hot connection phone conversations may be placed momentarily on hold by either of the respective automated and manual call processing means (215, 217) and then forwarded with no apparent interruption of connection to a lead buyer by way of the automated call forwarding unit 216 and forwarding connection 218 (which couples to the public telephone network and/or the internet). It will be seen later that the instant survey engine 290 can also operatively couple (292) to a live telecommunications channel portion 255b-255b' of the system for automatically detecting interaction termination and for responsively presenting a pre-formulated instant survey proposal to randomly selected lead buyers and for collecting hot-ranking response data from that queried buyers. Bus 255b' further couples to a so-called, leads delivery engine 255 which will be explained below. The leads delivery engine 255 can direct the automated call forwarding unit 216 to direct a given one of plural incoming calls for forwarding through connection 218 to a winning bidder of an automated auction carried out in core portion 250.

Details regarding the lead-offering and lead-buying business are provided in the above-cited U.S. Ser. No. 11/207, 571. Details regarding how leads may be segmented for intelligent offering to interested buyers are also provided in the above-cited U.S. Ser. No. 11/207,571. Basically, a lead buyer is someone who wants to vend certain goods and/or services to interested consumers of such goods and/or services and is seeking a way of making contact with such interested consumers. The lead seller is someone (e.g., a sponsor) who claims to have located an interested consumer and wishes to sell contact information and/or a live contact to the buyer. The auctioning system that is disclosed in yet more detail in the above-cited U.S. Ser. No. 11/207,571 provides an automated open market for buyers and sellers of leads. One set of the problems that lead buyers face includes worrying about whom to trust (not all lead sellers are honest—for example some may recycle old leads that have dried up) and whether fair value is being paid for each given lead.

In the system 200 of FIG. 2, automated lead generating programs may run in the various lead-capturing environments 211-213, 215 for controlling the lead capture process. For example, in the automated call processing unit 215, an interactive voice recognition (IVR) process may run for allowing a prospective consumer to respond with touch tone and/or voice responses to predefined question sequences generated by an IVR process such that the IVR subsystem generates a digitized lead from the responses provided by the prospective consumer. (Other terms for IVR may include VRU—voice recognition units, ISR—interactive speech recognition and so forth. The units may include automated dialers as well as automated voice interface with prospective consumers.) The IVR process may be encoded to include a CallXML™ or CCXML interface (where CCXML is an industry standard Extensible Markup Language or XML that is directed to providing telephony interface between human user and machine and CallXML™ is a private brand variation) or it may be encoded to include a VoiceXML™ interface (another variation) or any other appropriate, semantically tagged or other man-machine interface.

The digitized lead data which is generated by the IVR is forwarded via lead processing path 215a to lead receiver 230 while the call (analog or digital) is momentarily placed on hold along intermediate bus 215b. Shortly afterwards, unit 216 forwards the on-hold call to a winning bidder (winning lead buyer) and the winning bidder picks up the transferred hot connection call and continues manual conversation and/or continued automated IVR processing with the on-line prospective consumer as may be appropriate. In similar manner, digitized leads generated by a manual call processing center such as 217 are forwarded by path 217a to system core 250 while the on-hold call feeds to the automated call forwarding unit 216 by way of path 217b. The manual telephone operator in center 217 may tell the prospective consumer, "hold on one second while I transfer you to one of our specialists" and then unit 216 forwards the on-hold call to a winning bidder as selected by the exchange core system 250 (by a winner selector 254 within the core). The winning bidder picks up the transferred hot connection call and continues with manual conversation and/or automated IVR processing with the on-line prospective consumer as may be appropriate.

Before a winner is selected though, the automated call processing unit 215 and/or others of the lead various lead-capturing environments 211-213, 217 will have transferred their captured lead specifications to the system core 250 by way of appropriate, seller-side communication mechanisms 220. Examples of communication mechanisms include TCP/IP or similar networking protocols in general, HTTP based interfaces, SMTP or other email interfaces such as SMS, FTP or other data transfer protocols, Web Service protocols such as SOAP and so forth. Sellers may control their respective lead attracting and generating mechanisms 211-213 from respective seller control terminals 205. Alternatively or additionally, sellers may couple their control terminals 205 to the core 250 by way of various private connections 214 (wired or wireless).

While most of the data flowing from the sellers' interface devices 205-210 into the core portion 250 of the system comes in the form of digitized leads or lead specifications and/or hot connections, one kind of data that may flow back from the core 250 to the sellers' interface devices 210 in accordance with the present disclosure comes in the form of lead-processing feedback factors. These lead-processing feedback factors may include error and status indicating codes, indicators of the amounts of monies earned by the seller for one or more lead sales, and other quality feedback items 206 as will be detailed below. The seller-side interface devices 210 (or seller/buyer integrated software) are accordingly configured to not only produce lead data (classifiable lead descriptor data) for processing by the core 250 but also to receive and/or display the final-adjusted price credited to the seller's account for one or more given sales of a corresponding one or more leads and/or quality feedback items 206 received from the core 250 (including returned and disputed leads that had been bought). The feedback adjusted price and/or quality feedback items 206 do not generally appear on public portions of the seller's public attractor sites 211-213 but rather on private regions of the sellers' respective control terminals 205.

Block 230 represents a first core storage area where incoming leads are received and stored. Receipt and storage of leads may be optionally confirmed back to the sellers' respective control terminals 205 via the seller communication channels 220.

After receipt, each lead (L1, L2, . . . , Ln) is automatically processed by a validity verifier 251 to assure that the received lead appears to be legitimate. Automated validity verification may include pinging email or other addresses provided in the received lead data (e.g., 231) to verify that the addresses are legitimate. Validated leads are assigned unique lead identifications (Lead ID's).

The validated and uniquely identified leads are next sent to a classifying-and-matching unit 252. In one embodiment, each lead is mated to as many of the available and active buyer-profiles 253 in the system whose requirements (lead specifications) that lead can validly satisfy. Exact matching is not always necessary. In some embodiments, less than full matching of leads to buyer-profile specifications is allowed (providing the bidder authorizes it) and the bidder of a less than fully matched profile is awarded a discount if his bid wins in the competition for the lead.

Competition for the validated and matched lead occurs in unit 254. There, a bidding contest or auction is conducted and a winning bidder is selected. The ID's of the sold leads and the ID's of the winning bidders are sent to a delivery engine 255 so that sold leads are removed from the first storage area 230 and transferred for delivery according to the wishes of the winning bidder(s). In one embodiment, lead signals 255a provided to the delivery engine 255 include contact and/or qualification information about their corresponding potential customers (potential parties for a multi-party interaction, where the other parties will be one or more lead-buyers). In one embodiment, the qualification information indicates a qualification (e.g., income range, geographic location, motivation to close a deal in defined time span) of the corresponding party to participate in the interaction.

The illustrated, second storage area 260 of core 250 contains the activated and competing bid profiles (P1, P2, . . . , Pm). Each of these bid profiles (e.g., 261) came into being within storage area 260 as a result of buyer data sent by way of transmission channels 270. The transmitted buyer data can include one or more of the actual data for the bid profiles (P1, P2, . . . , Pm) or instructions for specifying what information is to be stored in, associated with, or activated within the buyer's bid profile (e.g., 261). As in the case of the seller-side transmission channels, the buyer-side channels 270 may include accommodations for communication mechanisms such as TCP/IP in general, HTTP based interfaces, SMTP or other email interfaces, FTP or other data transfer protocols, Web Service protocols such as XML based content and so forth. Channels 220 and 270 may be partially or fully integrated with one another. It is quite possible for some system users to function during a given day both as buyers and sellers or resellers of leads.

When a given lead is purchased by a buyer, it does not always have to be immediately delivered into the buyer's possession. Identifications of acquired leads can accumulate in delivery engine 255 for a specified period of time and can thereafter be batch delivered to the appropriate exclusive buyer or appropriate set of sharing buyers and/or their designated agents. The three schematic arrows of item 255a represent a batchable set of lead data that can be stored and delivered to the appropriate buyers (or their agents) at a substantially later time than the time of purchase. In one embodiment, the delivery engine 255 keeps track of the aging of deliverable leads it has stacked in its memory and delivery is initiated ahead of schedule if some leads age beyond a pre-defined threshold.

In some instances—especially hot contact situations—delivery of leads cannot be delayed by more than a very small amount of time (i.e. 0.1 minutes to 3 minutes, or less) because the lead includes a "hot connection," meaning that some party (e.g., a prospective consumer) is currently waiting on a telephone line (e.g., on lines 215b or 217b) or other live communications means (e.g., instant messaging link) and the seller needs to hand over (transfer, forward, etc.) control of that "hot connection" to the buyer relatively quickly (i.e., within 500 milliseconds) so that the buyer can continue the established communication and try to convert that communication into a lead closure. Item 255b represents such a live communication. The delivery engine 255 of one embodiment includes means for differentiating between leads that include hot connections or not, and for prioritizing different kinds of leads according to their aging (if appropriate) and urgency for immediate delivery. Accordingly, if a seller has had a prospective consumer on hold, on line 217b (for example) for a long time and another, non-hot lead (e.g., in group 255a) is sold first, the delivery engine 255 may include means for prioritizing the hot connection lead 255b as requiring delivery first and for accordingly delivering lead 255b soon after a corresponding buyer has purchased that hot connection lead 255b. In general, hot connection leads such as live or on-hold phone calls (or ongoing web chats) should be sold and transferred to the lead buyer as soon as practical (e.g., within less than 2 seconds of their initial capture and offer to sell). Connection 255b carries the transfer instructions for live or hot communications. The automated call forwarding unit 216 discussed above is an example of a means for redirecting a hot communication to a winning bidder.

After a given buyer (say B4 of user device group 280) has received delivery of a paid-for lead and has tried to convert the lead into a deal closure, the given buyer (B4) may discover that the purchased lead is defective in some way. In accordance with the invention, the buyer's interface device (e.g., B4) includes quality-of-lead descriptor means (QOL 285) for allowing the buyer to indicate what one or more defects the buyer found in the purchased lead. In one embodiment, the quality-of-lead descriptor means (QOL 285) supports both instant survey-takings and longer-form non-instant survey-takings.

In the case of instant survey-takings, engine 290 (instant survey engine) automatically detects a termination of interaction between the candidate (the prospective consumer of goods and/or services vended by the lead buyer) and the buyers agent (e.g., judge/grader 140 of FIG. 1). The instant survey-takings engine 290 uses a statistically appropriate sampling method to pick which lead buyers will receive the instant survey proposal (e.g., 144 of FIG. 1). For those of the hot-connection buyers which the engine 290 picks as samples, the engine keeps the connection 255b going (even if it means re-ringing the buyer) and the engine presents the survey proposal (144) to the buyer via one or more presentation means. The survey proposal presentation means may include an auditory presentation device such as the telephone receiver 143 shown in FIG. 1. Alternatively or additionally, the survey proposal presentation means may include a visual and/or other presentation device that may be integrated into the buyer's interface device (e.g., B4). For example, at the same time that "Please take a moment" pitch (see 134 of FIG. 1) plays through the buyer's telephone receiver (143), a flashing pop-up menu may appear on the buyer's computer screen to reinforce and/or validate the request. If the buyer says, No thanks, or hangs up, the pop-up menu quickly disappears and the engine 290 accepts the refusal as a non-responding sample point. If the buyer instead responds by pressing an appropriate touch-tone key (141) or speaking a suggested voice response or taking other response action as may be proposed visually through the pop-up menu (not shown) on the buyer's computer screen, the engine 290 collects the hot response information (and/or cold response information) by way of path 242 together with the buyer's identification information (buyer ID) for storage in the quality rating database unit 257. The corresponding lead ID and seller's ID are collected via path 232 for logical linking with the hot response 242.

Additionally, if the buyer responds to the instant survey proposal (144), the instant survey-takings engine 290 uses a statistically appropriate sampling method to pick which responding lead buyers will receive an extended instant survey proposal (e.g., 144 of FIG. 1). For those of the hot-connection buyers which the engine 290 picks as extended samples, the engine keeps the connection 255b going even longer and the engine presents additional survey proposals (144) plus possible reward offerings for extended hot responses to the selected buyers via one or more of the presentation means available.

The quality rating database 257 collects instant survey responses and older types of QOL ratings data from various users of the system and processes these according to empirically developed evaluation algorithms to arrive at weighted decisions regarding what rating (244) each seller should receive in view of his recently rated performance. Sellers who provide highly-rated leads will generally receive high feedback ratings (applause) from the sampled buyer community while sellers who provide poorly-rated leads will generally receive low feedback ratings (boos) from the sampled buyer community. The generated ratings signals 244 will reflect this feedback (e.g., 242) from the sampled buyer community.

As explained above, the QOL data 285 generated by buyers such as from buyer telecommunication device B4 is fedback along path 242. The fedback quality data may include one or more of a lead identifier, a buyer's hot and/or cold rating(s) of the lead quality (e.g., wrong tel. number) and an indication of whether the lead converted into a close or not. The fedback QOL data 285 may include an indication of how aged the feedback is relative to termination of contact with the candidate, i.e., is it a hot ranking or is it a cold ranking that was made after the emotional heat of the interaction and the immediate recollection of it has faded. Other buyers (e.g., B1, B2, B3) will have similar QOL means installed in their interface devices and will be able to send back similar lead feedback data along respective pathways such as 241 and 243. In one embodiment, not all buyers are empowered to return lead feedback data and/or the returned data of only of arbitrarily or selectively picked buyers is used in the receiving, quality rating database 257. Thus buyers do not know whose feedback data is being used or not to generate group ratings and the buyers cannot easily game the system. In one embodiment, the manager of the bids-and-leads processing system 200 decides which buyers are trusted ones whose feedback is to be always used by rater 257 (if sampled by the rater) for generating group ratings and/or which buyers are untrustworthy such that their feedback is to be never used by the rater 257 (even if sampled by the instant survey engine 290) for generating such group ratings. In one embodiment, only a subset of processed leads is rated, where the rated subset is sufficiently large to get a statistically significant rating of the corresponding seller's leads quality.

Depending on context, seller ID's may or may not be hidden from the corresponding buyers before and/or after bidding. In one embodiment, after receiving the lead—seller identity is initially hidden from bidders at bidding time, but after purchase, the purchased lead may reveal to the buyer information about how the lead was generated. In other words, it is generally (but not always) desirable to hide the seller ID from intermediary re-sellers,—but sometimes revealing the identity of the lead seller to the ultimate buyer can assist the ultimate lead buyer with the closing of the lead (converting the lead), for example by enabling the buyer to indicate to the prospective consumer, where, when, and/or with whom the consumer first interacted when they gave out their contact and/or other information. Even in cases where seller ID's are always hidden from buyers, the quality rating database 257 has access to the linkage between seller identifications and lead identifications (e.g., through path 232) as well as to the feedback information provided by the buyers. The quality rating database 257 produces on line 244, a seller quality indication signal which is supplied to discounting engine 258. Since the quality indication signal 244 can include an indication derived from the taking of instant surveys, such a quality indication signal 244 can allow the system 200 to respond fairly quickly to new sellers who engage with the system and begin to provide leads of varying quality to the buyer community.

In one embodiment, the price-setting/discounting engine 258 may be optionally deactivated so that sellers receive the full amount of each bid contest 254. When deactivated, the auction or bid settlement price 254a (received from unit 254) simply becomes the adjusted price 236. When the price-setting/discounting engine 258 is active however, the discounting engine 258 can reduce actual auction/bid settlement prices 254a by a number of factors, including for example, the seller markdown amount calculated from the seller quality indication signal 244. This seller markdown factor can be calculated on a per-seller basis or on a per-seller's-leads-sourcing account basis (a given seller might have different sources of leads with different qualities). The markdown factor can also be made a function of lead-contained data and historical performance—so that markdown is to some extent computed on a per-lead basis. Different algorithms may be devised for the rate of reduction as may be appropriate depending on a variety of parameters, including but not limited to: feedback from actual consumers into the system, feedback from intermediary system operators (i.e., manual validators as they perform manual screening of various leads), feedback from sellers regarding product, product price range, selling season, volume of leads and so forth. A high quality seller may receive 100% of the settled auction or bid price 254a (in other words a 0% markdown) while a medium quality seller may receive 80% and a poor quality seller may receive only 40%. The system rewards high quality sellers more so than poor quality sellers and can do so relatively quickly thanks to the inclusion of the instant survey engine 290. The adjusted lead price 236 that is credited to the seller's account is also debited (via coupling 246) from the corresponding buyer's account so that the buyer pays less for leads won from poor quality sellers. The seller interface devices 210 may include display means for displaying privately to the sellers (e.g., on terminals 205) what the adjusted price was, or what the downward adjustment percentage was in a given time period. More detailed quality feedback data may also be sent back for display on sellers interface devices 210 such as average buyer rating by multiple buyers for that seller (line 242) and/or average buyer closing rate for leads sold by that seller. The seller may then adjust his or her behavior accordingly. Since the instant survey engine 290 is present, sellers can receive fairly current rating information and can take corrective action relatively quickly if one of their lead sources is producing poorly-rated leads. Billing engine 259 couples by path 247 to the buyer devices 280 so that buyers can run database queries on how much they have spent for purchasing leads. More generally, a reports engine 256 may be provided in the system for generating database reports on allowed data for each of the seller and buyer groups. Path 256a connects to the sellers. Path 256b connects to the buyers. Buyers are blocked from seeing seller identifications. (Otherwise they might try to bypass the exchange system core 250 and deal with the sellers directly after having gained benefit of the core's production of seller ratings 244.) Sellers are blocked from seeing bid profiles 260. (Otherwise such sellers might try to limit the extent of their offerings and target only the highest priced bids.)

In one embodiment, the leads offer-and-buy exchange system 200 maintains a historical database of each seller's recent and past performance over a time period of predetermined length and penalizes the seller to some extent if the seller exhibited poor lead quality in that time period. One algorithm for evaluating a given seller's past performance normalizes the given seller's closure rate (the percentage of leads that culminated in closed deals during the evaluation period) against the average closure rate of a top X % by volume of a representative sampled subset of all sellers using the system and engaged in that product line, where X % is a predetermined factor such as 5%, 10%, or 25%. The system however rewards the seller if the current lead exhibits characteristics that make the one lead better than average leads offered by the seller. For example, in one embodiment the exchange system 200 maintains a historical database of known customer past performances over a recent time period of predetermined length and rewards the seller to some extent if the current lead points to a prospective consumer of known good consuming activity in the predefined time period. Conversely, the system can penalize a generally good seller if the consumer to which the current lead points has known bad consuming activities in the predefined time period. A generalized algorithm for price adjustment may take on the following form:

$$\text{Price Discount rate} = a*\text{SellerAccountDiscountRate} + b*\text{CurrentLeadDiscountRate}$$

where a and b are predetermined weighting coefficients for the given product line, where Seller_Account_Discount_Rate is a variable that can be positive or negative and is based on historic data such as closing rate of this seller's account versus accounts of the best known lead sources, and where Current_Lead_Discount_Rate is a variable that can be positive or negative and is based on of specifics of the offered lead such as for example, reducing the Price Discount Rate to as low as 0% due to the fact that the pointed-to customer is a repeat customer who recently bought a different product and is therefore highly likely to buy the current product. One the other hand, for some products, if the pointed-to customer is a repeat customer who recently bought the same product, that might be a factor that penalizes the seller by increasing the Price Discount Rate. The algorithm can have many more weighted variables and the operations of each may vary from product line to product line as well as between different classes of leads (high quality leads versus lower band ones).

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A machine-implemented live lead managing method comprising:
  receiving bid profiles from corresponding lead buyers, wherein each bid profile includes specifications for desired leads and a bid;
  after receipt of the bid profiles, receiving a live lead from one of a plurality of lead sellers, wherein the live lead includes a telecommunication link with a waiting human caller and lead data corresponding to the waiting human caller;
  comparing the bid profiles to the live lead's lead data to select matching ones of the bid profiles according to their bid profile specifications;
  determining a winning bid profile and a corresponding winning bid from the selected matching bid profiles;
  calculating an adjusted lead price responsive to the winning bid and a markdown, the markdown comprising a per-seller discount associated with the lead seller that provided the live lead;
  crediting a seller account of the lead seller that provided the live lead based on the adjusted lead price;
  debiting a buyer account of the lead buyer corresponding to the winning bid profile based on the adjusted lead price;
  redirecting the live lead's telecommunication link to transfer the waiting human caller to the lead buyer corresponding to the winning bid profile, thereby allowing the lead buyer to continue communication with the waiting human caller through a call on the live lead's telecommunication link;
  automatically detecting a termination of the call by either the human caller or the lead buyer;
  in response to the automated detection of the call termination, telephonically coupling the lead buyer to an automated survey engine that then presents a survey to the lead buyer and collects a freshly recalled evaluation of the just-concluded call; and
  updating, using the freshly recalled evaluation, seller quality information associated with the lead seller that provided the live lead, wherein the per-seller discount is determined based on the seller quality information.

2. The live lead managing method of claim 1, wherein:
said automatic detecting of the call termination includes at least one of:
  detecting a telephone hang-up event;
  detecting an end of message (EOM) code; and
  detecting a prespecified sequence of automatically generated codes that indicate a termination of the call.

3. The live lead managing method of claim 1, wherein the markdown further comprises a per-lead discount associated with the live lead.

4. The live lead managing method of claim 3, wherein the per-lead discount is determined based on the lead data and a historical performance of the human caller.

5. The live lead managing method of claim 1, wherein the seller quality information associated with the lead seller comprises an indication of a historical lead closure rate for the lead seller.

6. The live lead managing method of claim 1, wherein the call is a telephonic call and terminated by the human caller, and wherein the lead buyer is telephonically coupled to the automated survey engine while the lead buyer is still remaining on-line after the call termination by the human caller.

7. The live lead managing method of claim 1, wherein the call is a telephonic call and terminated by the lead buyer, and wherein the telephonically coupling comprises redialing and reconnecting to the lead buyer within a specified time limit after the call termination by the lead buyer.

8. The live lead managing method of claim 1, further comprising providing at least a portion of the seller quality data to the corresponding lead seller for review.

* * * * *